(12) United States Patent
Njolstad et al.

(10) Patent No.: US 10,534,448 B2
(45) Date of Patent: Jan. 14, 2020

(54) INTERACTIVE PROJECTOR AND INTERACTIVE PROJECTION SYSTEM

(71) Applicant: SEIKO EPSON CORPORATION, Tokyo (JP)

(72) Inventors: Tormod Njolstad, Trondheim (NO); Gudmund Ake Slettemoen, Klaebu (NO); Oystein Damhaug, Jessheim (NO); Shinji Kubota, Ina (JP)

(73) Assignee: SEIKO EPSON CORPORATION, Tokyo (JP)

( * ) Notice: Subject to any disclaimer, the term of this patent is extended or adjusted under 35 U.S.C. 154(b) by 58 days.

(21) Appl. No.: 15/559,158

(22) PCT Filed: Mar. 16, 2016

(86) PCT No.: PCT/JP2016/001520
§ 371 (c)(1),
(2) Date: Sep. 18, 2017

(87) PCT Pub. No.: WO2016/157786
PCT Pub. Date: Oct. 6, 2016

(65) Prior Publication Data
US 2018/0067567 A1 Mar. 8, 2018

(30) Foreign Application Priority Data
Mar. 27, 2015 (JP) .................................. 2015-065633

(51) Int. Cl.
*G06F 3/0346* (2013.01)
*G06F 3/042* (2006.01)
*G06F 3/0354* (2013.01)

(52) U.S. Cl.
CPC ........ *G06F 3/0346* (2013.01); *G06F 3/03542* (2013.01); *G06F 3/042* (2013.01); *G06F 2203/04108* (2013.01)

(58) Field of Classification Search
CPC .... G06F 3/0346; G06F 3/03542; G06F 3/042; G06F 3/0425; G06F 2203/04108
(Continued)

(56) References Cited

U.S. PATENT DOCUMENTS 5,757,674 A * 5/1998 Marugame ............... G02B 7/28
359/204.1
8,947,402 B2 * 2/2015 Lawrence ............ G03H 1/0005
345/175
(Continued)

FOREIGN PATENT DOCUMENTS

DE 2011 119082 A1 5/2013
JP 2011-180712 A 9/2011
(Continued)

OTHER PUBLICATIONS

Oct. 10, 2018 Search Report issued in European Patent Application No. 16771680.2.
(Continued)

*Primary Examiner* — Jason M Mandeville
(74) *Attorney, Agent, or Firm* — Oliff PLC

(57) ABSTRACT

Detection accuracy of a distance between a tip of a pointing element and a screen is to be improved. An interactive projector includes a projection unit, a plurality of cameras, and a position detection unit that detects a three-dimensional position of the pointing element with respect to the projected screen based on a plurality of images including the pointing element of which the image is captured by the plurality of cameras. When a direction separated from the projected screen is defined as a Z direction, the second camera is arranged at a position nearer the projected screen than that of the first camera in the Z direction.

5 Claims, 7 Drawing Sheets

(58) Field of Classification Search
USPC .......................................... 345/156, 173, 175
See application file for complete search history.

(56) References Cited

U.S. PATENT DOCUMENTS

| | | | |
|---|---|---|---|
| 9,582,084 B2* | 2/2017 | Kubota | .................... H04N 9/31 |
| 2002/0021287 A1* | 2/2002 | Tomasi | ................. G06F 1/1613 |
| | | | 345/168 |
| 2009/0103780 A1* | 4/2009 | Nishihara | ............... G06F 3/017 |
| | | | 382/103 |
| 2011/0248963 A1* | 10/2011 | Lawrence | ............ G03H 1/0005 |
| | | | 345/175 |
| 2013/0055143 A1 | 2/2013 | Martin et al. | |
| 2014/0015950 A1* | 1/2014 | Kobayashi | ............ G06F 3/0425 |
| | | | 348/77 |
| 2016/0057406 A1* | 2/2016 | Perriollat | ............. G01B 11/245 |
| | | | 348/48 |

FOREIGN PATENT DOCUMENTS

| | | | |
|---|---|---|---|
| JP | 2012-150636 A | 8/2012 | |
| JP | 2015-038777 A | 2/2015 | |

OTHER PUBLICATIONS

May 17, 2016 International Search Report issued in International Patent Application No. PCT/JP2016/001520.

* cited by examiner

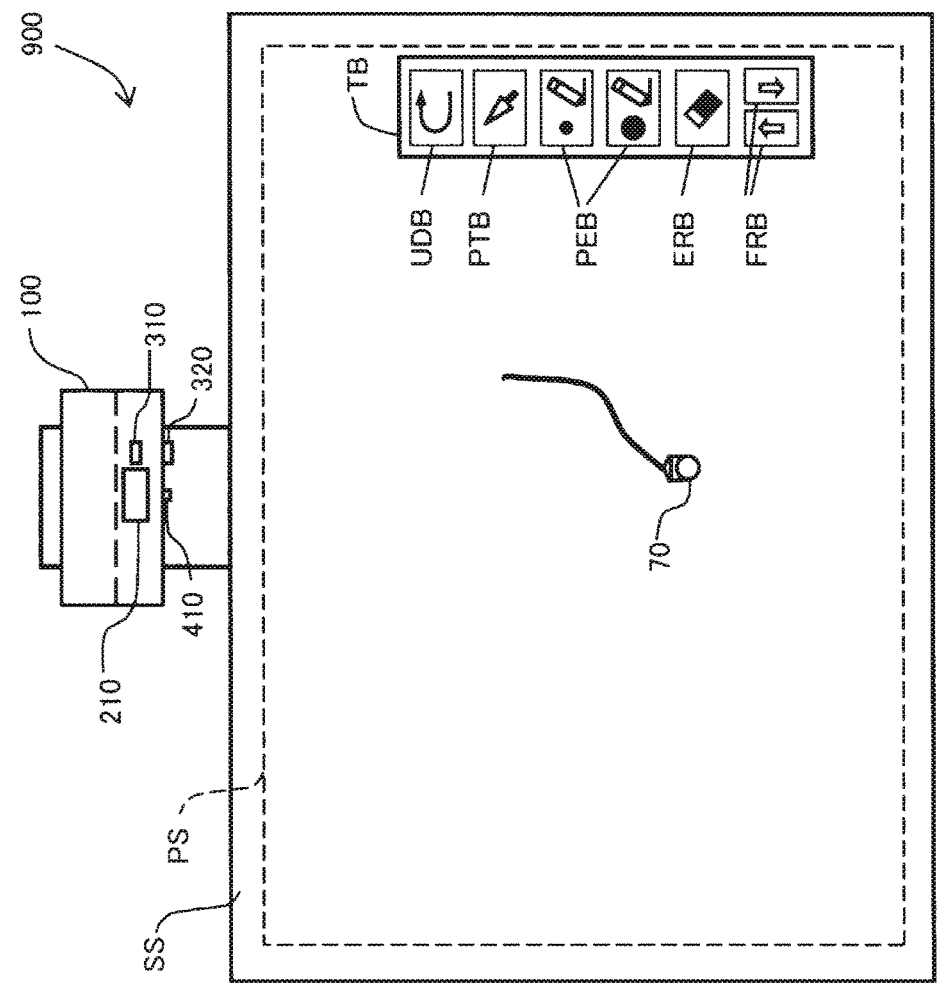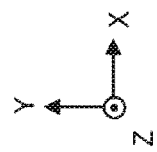
FIG. 2B
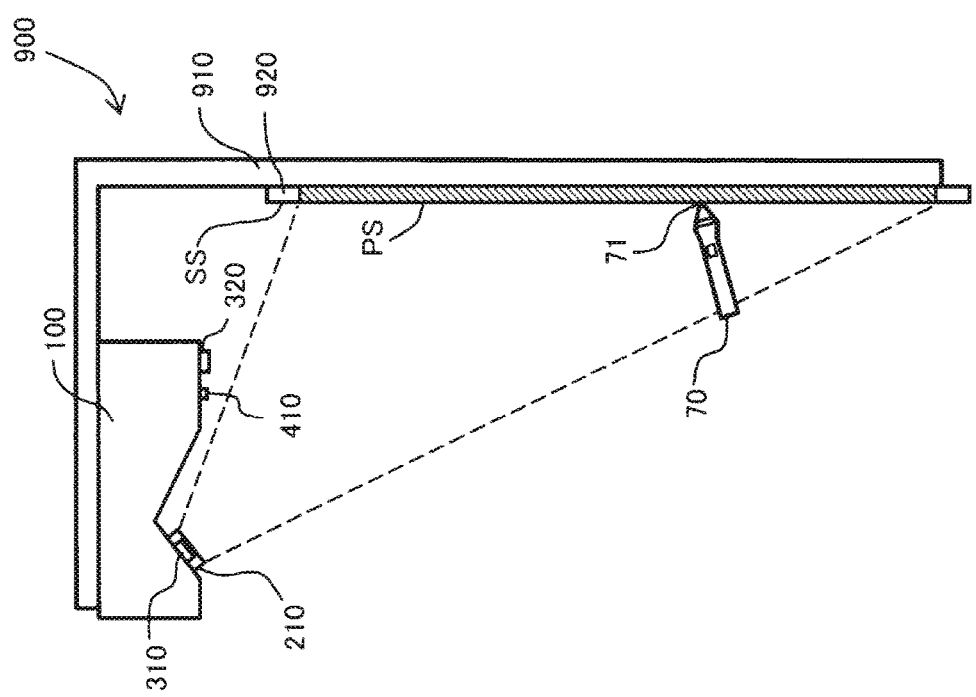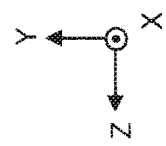
FIG. 2A

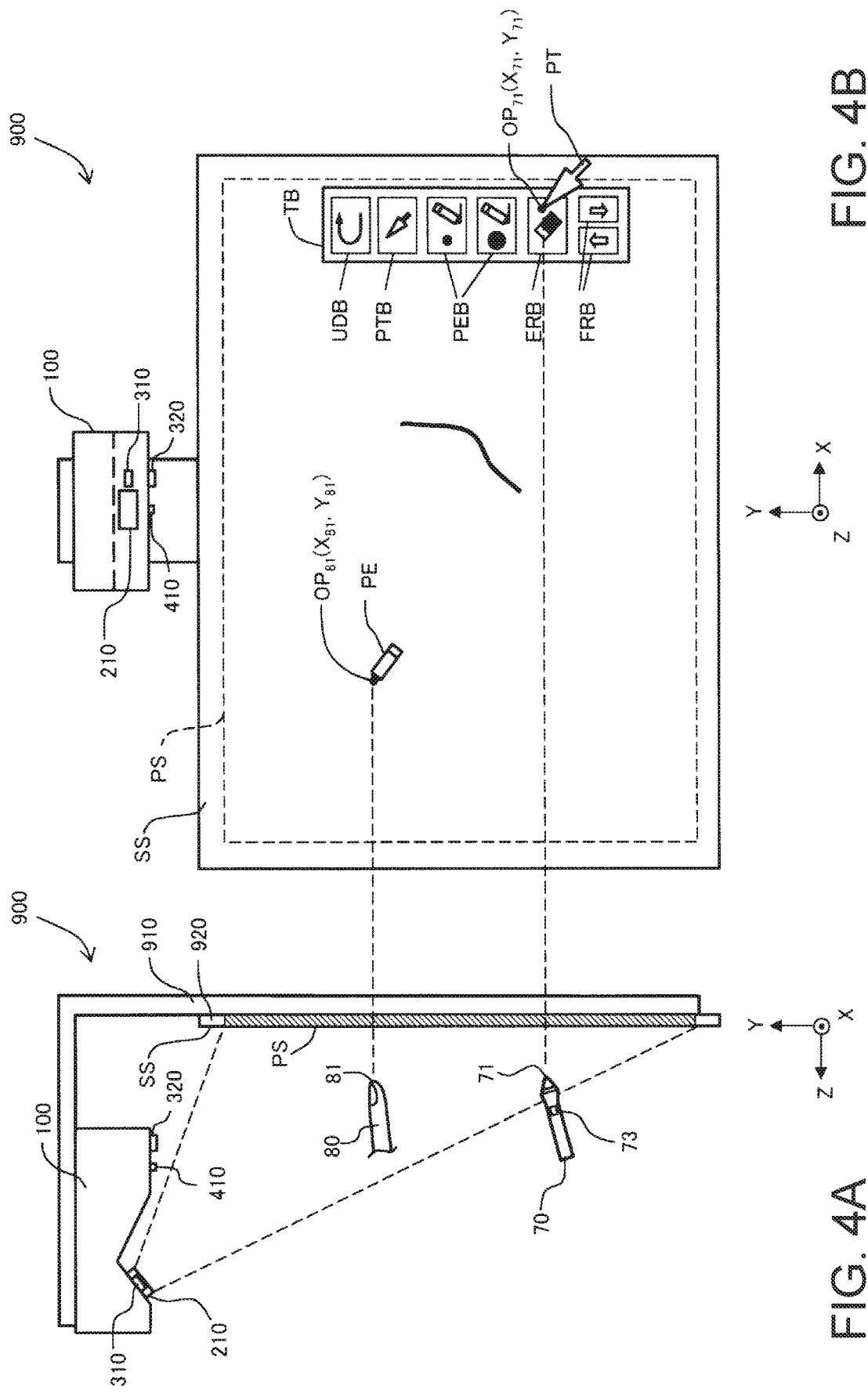

INTERACTIVE PROJECTOR AND INTERACTIVE PROJECTION SYSTEM

TECHNICAL FIELD

The present invention relates to an interactive projector capable of receiving an instruction by a pointing element of a user with respect to a projected screen and a system thereof.

BACKGROUND ART

In PTL 1, a projection type display device (projector) which projects a projected screen on a screen and captures an image including an object such as a finger by a camera so as to make it possible to detect a position of the object using the captured image is disclosed. The object such as the finger is used as the pointing element for giving an instruction to the projected screen. That is, when a tip of the object is in contact with the screen, the projector recognizes that a predetermined instruction such as rendering is input to the projected screen and re-renders the projected screen according to the instruction. Accordingly, the user is able to input various instructions by using the projected screen as a user interface. As such, a type of projector capable of using the projected screen on the screen as a user interface by which input can be made is called an "interactive projector". An object used for giving an instruction to the projected screen is called a "pointing element".

CITATION LIST

Patent Literature

PTL 1: JP-A-2012-150636

SUMMARY OF INVENTION

Technical Problem

In a typical interactive projector, it is determined whether the instruction is given by the pointing element or not according to whether the tip of the pointing element is in contact with the screen or not. Accordingly, detection of a distance between a tip of the pointing element and a screen is important. However, in the related art, detection accuracy of the distance between the tip of the pointing element and the screen was not necessarily enough and thus, it was desirable to improve detection accuracy.

Solution to Problem

The invention is intended to solve at least some of the problems described above and can be realized by the following aspects or application examples.

(1) According to an aspect of the invention, there is provided an interactive projector receiving an instruction by a pointing element of a user with respect to a projected screen. The interactive projector includes a projection unit that projects the projected screen on a screen surface, a plurality of cameras that include a first camera and a second camera capturing an image of an area of the projected screen, and a position detection unit that detects a three-dimensional position of the pointing element with respect to the projected screen based on a plurality of images including the pointing element of which the image is captured by the plurality of cameras. When a direction separated from the projected screen is defined as a z direction, the second camera is arranged at a position nearer the projected screen than that of the first camera in the Z direction.

According to the interactive projector, resolution with respect to a normal direction of the projected screen of the image captured by the second camera located at a position near the projected screen becomes higher compared to that of the image captured by the first camera, and it is possible to more accurately determine a distance from the projected screen of the pointing element.

(2) In the interactive projector, the first camera may have a first optical axis directed toward a first direction, the second camera may have a second optical axis directed toward a second direction, and both the first direction and the second direction may be directions which pass through an area of the projected screen and are inclined from both the Z direction and a direction perpendicular to the z direction.

According to this configuration, it is possible to more accurately determine the distance from the projected screen of the pointing element.

(3) In the interactive projector described above, the first direction and the second direction may be parallel to each other.

According to this configuration, it is possible to further accurately determine a three-dimensional position of the pointing element.

(4) In the interactive projector described above, angles between each of the first and second directions and the Z direction may be in a range from 50 to 70 degrees.

According to this configuration, it is possible to further accurately determine the three-dimensional position of the pointing element.

(5) In the interactive projector described above, when it is defined that two directions orthogonal to each other on the projected screen and perpendicular to the Z direction are the X direction and the Y direction, a +Y direction is called an upward direction and a −Y direction is called a downward direction, and the projected screen is projected on a position located lower than the interactive projector, the second camera (i) may be arranged at a position farther deviated in the upward direction than the first camera in the Y direction, and (ii) may be arranged at a position to which a distance from the lower end of the projected screen is nearer than that of the first camera.

According to this configuration, the distance from the lower end of the projected screen in the second camera is nearer than that of the first camera and thus, it is possible to install the second camera in the upward direction while maintaining resolution of the Z coordinate in the second camera higher than that of the first camera. As a result, a difference in magnification of Y direction between the vicinity of the upper end and the vicinity of the lower end of the projected screen becomes small in the image captured by the second camera and thus, it is possible to increase detection accuracy of the three-dimensional position.

The invention can be realized by various aspects, for example, a system including one or both of a screen and a self-light emitting pointing element and an interactive projector, a control method or a control device of the interactive projector, a computer program for realizing functions of the method or device, and a non-transitory storage medium in which the computer program is stored.

BRIEF DESCRIPTION OF DRAWINGS

FIG. 2A is a side view of the interactive projection system.

FIG. 2B is a front view of the interactive projection system.

FIG. 4A is an explanatory diagram for illustrating a situation of operations using the self-light emitting pointing element and a non-light-emitting pointing element.

FIG. 4B is an explanatory diagram for illustrating a situation of operations using the self-light emitting pointing element and a non-light-emitting pointing element.

DESCRIPTION OF EMBODIMENTS (A. Outline of System)

Figure 1:
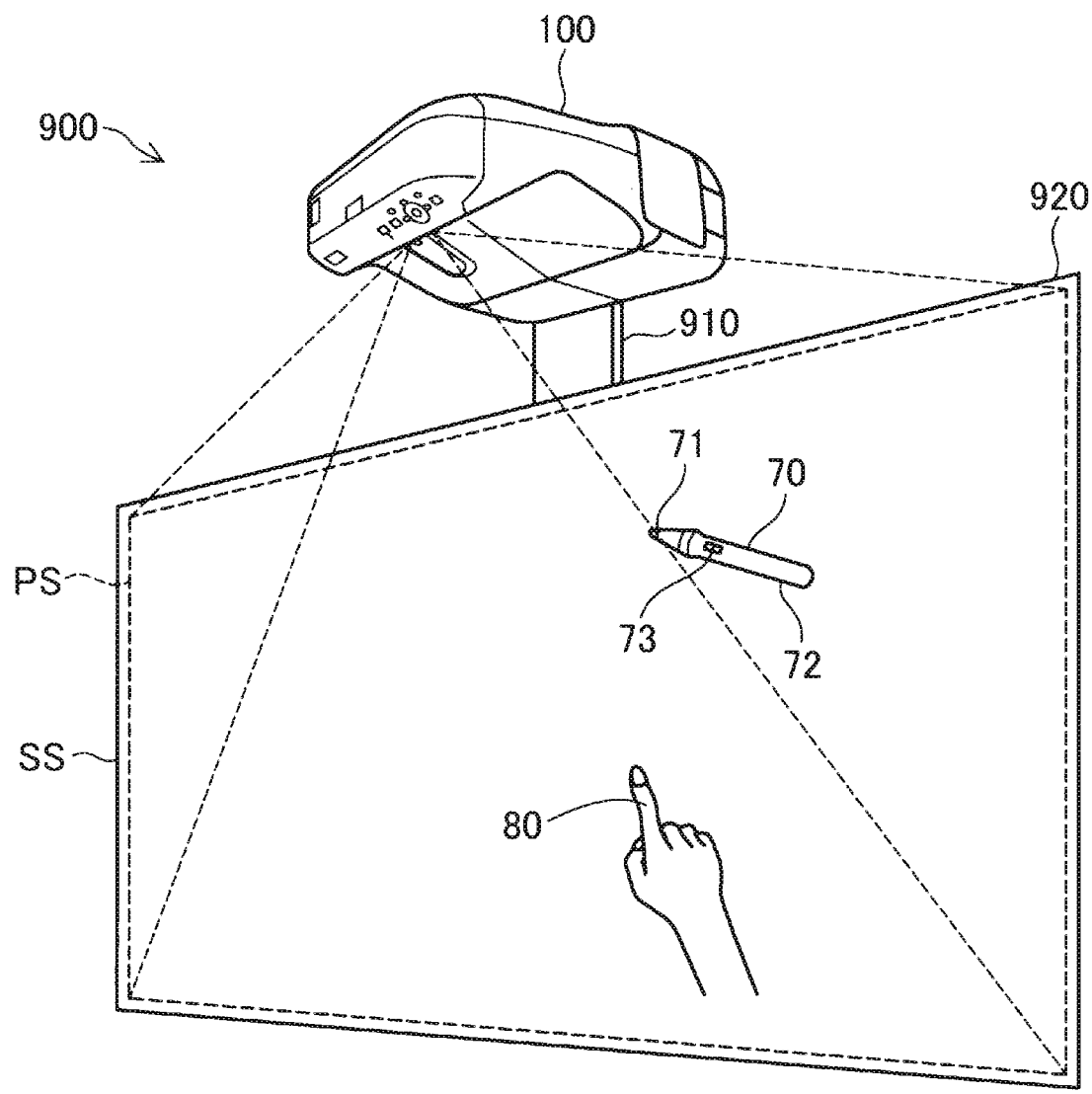
FIG. 1 is a perspective view of an interactive projection system.

FIG. 1 is a perspective view of an interactive projection system 900 according to an embodiment of the invention. The system 900 includes an interactive projector 100, a screen plate 920, and a self-light emitting pointing element 70. A front surface of the screen plate 920 is used as a projection screen surface SS. The projector 100 is fixed to the front and above the screen plate 920 by a support member 910. In FIG. 1, although the projection screen surface SS is arranged vertically, the system 900 in which the projection screen surface SS is arranged horizontally can also be used.

The projector 100 projects a projected screen PS on the projection screen surface SS. The projected screen PS normally includes an image rendered within the projector 100. In a case where the image rendered within the projector 100 is not present, the projected screen PS is irradiated with light from the projector 100 and a white-colored image is displayed on the projected screen PS. In the present specification, a "projection screen surface SS" (or "screen surface SS") means a surface of a member on which an image is projected. The "projected screen PS" means an area of the image projected on the projection screen surface SS by the projector 100. Normally, the projected screen PS is projected on a portion of the projection screen surface SS.

The self-light emitting pointing element 70 is a pen type pointing element including a tip portion 71 capable of emitting light, a shaft portion 72 held by a user, and a button switch 73 provided on the shaft portion 72. A configuration and function of the self-light emitting pointing element 70 will be described later. In the system 900, one or a plurality of self-light emitting pointing elements 70 can be used together with one or a plurality of non-light-emitting pointing elements 80 (non-light-emitting pen, finger, or the like).

FIG. 2A is a side view of the interactive projection system 900 and FIG. 2B is a front view thereof. In the present specification, a direction along the left and right of the screen surface SS is defined as the X direction, a direction along the up and down of the screen surface SS is defined as the Y direction, and a direction along the normal direction of the screen surface SS is defined as the Z direction. For convenience of explanation, the X direction is also called a "left and right direction", the Y direction is also called an "up and down direction", and the Z direction is also called a "front and rear direction". A direction, in which the projected screen PS exists, of the Y direction (up and down direction), when viewed from the projector 100 is called a "down direction". In FIG. 2A, for convenience of illustration, a range of the projected screen PS of the screen plate 920 is hatched.

The projector 100 includes a projection lens 210 projecting the projected screen PS on the screen surface SS, a first camera 310 and a second camera 320 that capture an image of an area of the projected screen PS, and a detection light irradiation unit 410 for illuminating detection light on a pointing element (self-light emitting pointing element 70 and non-light-emitting pointing element 80). As detection light, for example, near-infrared light is used. Two cameras 310 and 320 have at least a first image-capturing function of receiving light in a wavelength region which includes a wavelength of detection light and capturing an image. At least one of two cameras 310 and 320 has a second image-capturing function of receiving visible light and capturing an image, and it is preferable that the two image-capturing functions are configured to be switchable. It is preferable that for example, a near-infrared filter which shields visible light and transmits only near-infrared light is arranged ahead of a lens in the two cameras 310 and 320 or a near-infrared filter switching mechanism (not illustrated) capable of being retreated from ahead of the lens is provided in each of the two cameras 310 and 320. The arrangement and direction of two cameras 310 and 320 will be described later.

In an example of FIG. 2B, a situation in which the interactive projection system 900 operates in a whiteboard mode is illustrated. The whiteboard mode is a mode at which a user is able to arbitrary perform rendering on the projected screen PS using the self-light emitting pointing element 70 or the non-light-emitting pointing element 80. The projected screen PS including a toolbox TB is projected on the screen surface SS. The toolbox TB includes a cancel button UDB for restoring processing, a pointer button PTB for selecting a mouse pointer, a pen button PEB for selecting a pen tool for rendering, an eraser button ERB for selecting an eraser tool to erase a rendered image, and a forward/rearward button FRB for allowing a screen to be advanced to a next screen or returned to a previous screen. The user is able to click the buttons using the pointing element so as to make it possible to perform processing according to the touched button or select a tool. Immediately after the activation of the system 900, the mouse pointer may be selected as a default tool. In the example of FIG. 2B, a situation is rendered, in which in a state where the tip portion 71 of the self-light emitting pointing element 70 is in contact with the screen surface SS after the user selects the pen tool, the tip portion 71 is moved within the projected screen PS such that a line is being rendered within the projected screen PS. Rendering of the line is performed by a projection image preparation unit (which will be described later) inside of the projector 100.

The interactive projection system 900 is also operable at a mode other than the whiteboard mode. For example, the system 900 is also operable at a PC interactive mode at which an image of data transferred via a communication line from a personal computer (not illustrated) is displayed on the projected screen PS. In the PC interactive mode, for example, an image of data of spreadsheet software or the like can be displayed and input, preparation, correction, or the like of data becomes possible using various tools or icons displayed within the image.

Figure 3:
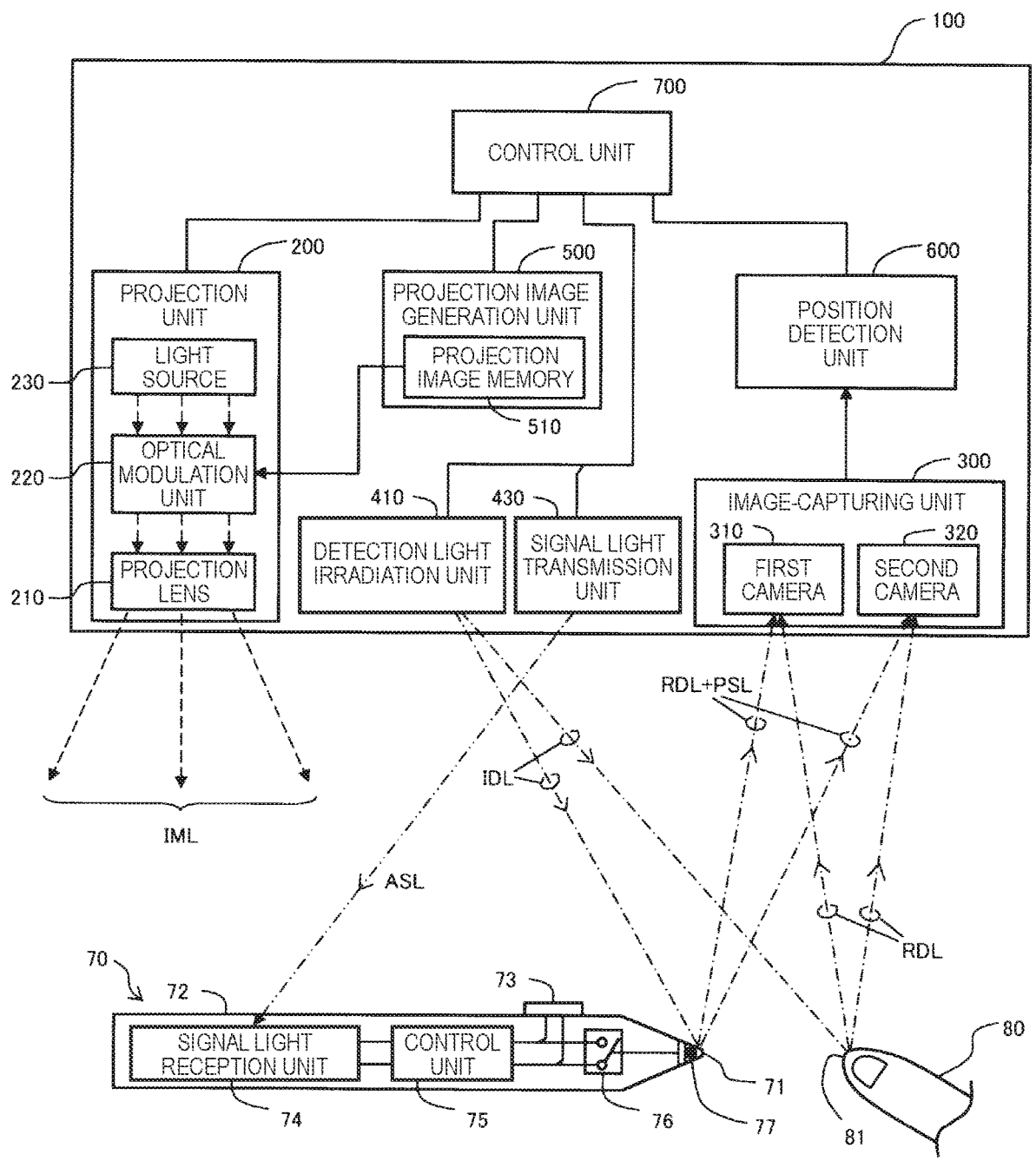
FIG. 3 is a block diagram illustrating internal configurations of a projector and a self-light emitting pointing element.

FIG. 3 is a block diagram illustrating internal configurations of the interactive projector 100 and the self-light emitting pointing element 70. The projector 100 includes a control unit 700, a projection unit 200, a projection image generation unit 500, a position detection unit 600, an image-capturing unit 300, a detection light irradiation unit 410, and a signal light transmission unit 430.

The control unit 700 controls respective units inside the projector 100. The control unit 700 determines a content of an instruction performed on the projected screen PS by the pointing element (self-light emitting pointing element 70 and non-light-emitting pointing element 80) detected by the position detection unit 600 and instructs the projection image generation unit 500 to prepare or change the projected image according to the content of the instruction.

The projection image generation unit 500 includes a projection image memory 510 storing the projected image and has a function of generating the projected image projected on the screen surface SS by the projection unit 200. Also, the projection image generation unit 500 preferably has a function as a keystone correction unit correcting a trapezoidal distortion of the projected screen PS (FIG. 2B).

The projection unit 200 has a function of projecting the projected image generated by the projection image generation unit 500 on the screen surface SS. The projection unit 200 includes an optical modulation unit 220 and a light source 230, in addition to the projection lens 210 described in FIG. 2.

The optical modulation unit 220 modulates light from the light source 230 according to projected image data, which is given from the projection image memory 510, to form projection image light IML. Projection image light IML is typically color image light including visible light of three colors of RGB and is projected on the screen surface SS by the projection lens 210. As the light source 230, various light sources such as a light emitting diode or a laser diode may be adopted, in addition to a light source lamp such as an ultra-high pressure mercury lamp. A transmission type or reflection type liquid crystal panel or a digital mirror device may be adopted as the optical modulation unit 220, and the optical modulation unit 220 may be configured to include a plurality of modulation units 220 for each color light.

The detection light irradiation unit 410 irradiates the screen surface SS and a portion across space in front thereof with irradiation detection light IDL for detecting the tip portion of the pointing element (self-light emitting pointing element 70 and non-light-emitting pointing element 80). As irradiation detection light IDL, for example, near-infrared light is used. The detection light irradiation unit 410 is turned on only at a predetermined period which includes image-capturing timings of the cameras 310 and 320 and turned off at other periods. Otherwise, the detection light irradiation unit 410 may be maintained always in a state of being turned on during operation of the system 900.

The signal light transmission unit 430 has a function of transmitting apparatus signal light ASL which is received by the self-light emitting pointing element 70. Apparatus signal light ASL is near-infrared light signal for synchronization and is regularly emitted from the signal light transmission unit 430 of the projector 100 to the self-light emitting pointing element 70. A tip light-emitting portion 77 of the self-light emitting pointing element 70 emits pointing element signal light PSL (which will be described later), which is near-infrared light having a predetermined light emitting pattern (light-emitting sequence), in synchronization with apparatus signal light ASL. When position detection of the pointing element (self-light emitting pointing element 70 and non-light-emitting pointing element 80) is performed, the cameras 310 and 320 of the image-capturing unit 300 execute image-capturing at a predetermined timing synchronized with apparatus signal light ASL.

The image-capturing unit 300 includes the first camera 310 and the second camera 320 described in FIG. 2. As previously described, two cameras 310 and 320 have a function of receiving light in a wavelength region, which includes the wavelength of detection light, and capturing an image. In an example of FIG. 3, a situation in which irradiation detection light IDL irradiated by detection light irradiation unit 410 is reflected by the pointing element (self-light emitting pointing element 70 and non-light-emitting pointing element 80) and reflection detection light RDL is received and captured an image thereof by two cameras 310 and 320 is rendered. Two cameras 310 and 320 also receive pointing element signal light PSL which is near-infrared light and emitted from the tip light-emitting portion 77 of the self-light emitting pointing element 70 and capture an image thereof. Image-capturing of two cameras 310 and 320 is executed at both of a first period during which irradiation detection light IDL emitted from the detection light irradiation unit 410 is in an on state (light-emitting state) and a second period during which irradiation detection light IDL is in an off state (non-light-emitting state). The position detection unit 600 compares images in the two kinds of periods to thereby make it possible to determine whether individual pointing elements included in the images are the self-light emitting pointing element 70 or non-light-emitting pointing element 80.

It is preferable that at least one of two cameras 310 and 320 has a function of capturing an image using light, which includes visible light, in addition to function of capturing an image using light, which includes near-infrared light. In this case, an image of the projected screen PS projected on the screen surface SS is captured by the camera to make it possible for the projection image generation unit 500 to execute keystone correction using the image. Since a method of the keystone correction using one or more cameras is well known, description thereof will be omitted here.

The position detection unit 600 has a function of determining a three-dimensional position of the tip portion of the pointing element (self-light emitting pointing element 70 and non-light-emitting pointing element 80) by using triangulation, using the images captured by two cameras 310 and 320. In this case, the position detection unit 600 also determines whether individual pointing elements within the images are the self-light emitting pointing element 70 or the non-light-emitting pointing element 80 by using the light emitting pattern of the self-light emitting pointing element 70.

The self-light emitting pointing element 70 is provided with a signal light reception unit 74, a control unit 75, a tip switch 76, and a tip light-emitting portion 77, in addition to a button switch 73. The signal light reception unit 74 has a function of receiving apparatus signal light ASL emitted from the signal light transmission unit 430 of the projector 100. The tip switch 76 is a switch which becomes an on state when the tip portion 71 of the self-light emitting pointing element 70 is pushed and becomes an off state when the tip portion 71 is released. The tip switch 76 is normally in the off state and becomes the on state by a contact pressure when the tip portion 71 of the self-light emitting pointing element 70 contacts with the screen surface SS. When the tip switch 76 is in the off state, the control unit 75 causes the tip light-emitting portion 77 to emit light in a specific first light emitting pattern, which indicates that the tip switch 76 is in the off state, so as to emit pointing element signal light PSL having the first light emitting pattern. On the other hand, when the tip switch 76 is in the on state, the control unit 75 causes the tip light-emitting portion 77 to emit light in a specific second light emitting pattern, which indicates that the tip switch 76 is in the on state, so as to emit pointing element signal light PSL having the second light emitting pattern. The first light emitting pattern and the second light emitting pattern are different from each other and thus, the position detection unit 600 analyzes the images captured by two cameras 310 and 320 to thereby make it possible to identify whether the tip switch 76 is the on state or the off state.

As described above, in the present embodiment, contact determination whether the tip portion 71 of the self-light emitting pointing element 70 is in contact with the screen surface SS is performed according to the on/off of the tip switch 76. The three-dimensional position of the tip portion 71 of the self-light emitting pointing element 70 can be obtained by triangulation using images captured by two cameras 310 and 320 and thus, it is also possible to execute contact determination of the tip portion 71 of the self-light emitting pointing element 70 using the three-dimensional position. However, detection accuracy of the Z coordinate (coordinate of the screen surface SS in the normal direction) by triangulation may not necessarily be high. Accordingly, when contact determination is performed according to the on/off of the tip switch 76, it is preferable in that contact determination can be executed more accurately.

The button switch 73 of the self-light emitting pointing element 70 has the same function as that of the tip switch 76. Accordingly, the control unit 75 causes the tip light-emitting portion 77 to emit light in the second light emitting pattern in a state where the button switch 73 is pushed by the user and causes the tip light-emitting portion 77 to emit light in the first light emitting pattern in a state where the button switch 73 is not pushed by the user. In other words, the control unit 75 causes the tip light-emitting portion 77 to emit light in the second light emitting pattern in a state where at least one of the tip switch 76 and the button switch 73 is in the on state and causes the tip light-emitting portion 77 to emit light in the first light emitting pattern in a state where both of the tip switch 76 and the button switch 73 are in the off state.

However, the button switch 73 may be assigned a function different from the tip switch 76. For example, in a case where the button switch 73 is assigned the same function as the right click button of a mouse, when the user pushes the button switch 73, a right click instruction is delivered to the control unit 700 of the projector 100 and processing according to the instruction is executed. As such, in a case where the button switch 73 is assigned the function different from the tip switch 76, the tip light-emitting portion 77 emits light in four light emitting patterns which are different from each other according to the on/off state of the tip switch 76 and the on/off state of the button switch 73. In this case, the self-light emitting pointing element 70 is able to deliver the instruction to the projector 100 while distinguishing four combinations of the on/off states of the tip switch 76 and the button switch 73.

FIG. 4 are explanatory diagrams illustrating a situation of an operation performed using the self-light emitting pointing element 70 and the non-light-emitting pointing element 80. In this example, both the tip portion 71 of the self-light emitting pointing element 70 and the tip portion 81 of the non-light-emitting pointing element 80 are separated from the screen surface SS. The XY coordinates $(X_{71}, Y_{71})$ of the tip portion 71 of the self-light emitting pointing element 70 are on an eraser button ERB of a toolbox TB. Here, a mouse pointer PT is selected as a tool representing a function of the tip portion 71 of the self-light emitting pointing element 70 and the mouse pointer PT is rendered on the projected screen PS such that the tip $OP_{71}$ of the mouse pointer PT is present on the eraser button ERB. As previously described, the three-dimensional position of the tip portion 71 of the self-light emitting pointing element 70 is determined by triangulation using the images captured by two cameras 310 and 320. Accordingly, the mouse pointer PT is rendered on the projected screen PS in such a way that the operation point $OP_{71}$ present in the tip of the mouse pointer PT is arranged on the position of the XY coordinates $(X_{71}, Y_{71})$ among the three-dimensional coordinates $(X_{71}, Y_{71}, Z_{71})$ of the tip portion 71 determined by triangulation. That is, the tip $OP_{71}$ of the mouse pointer PT is arranged on the XY coordinates $(X_{71}, Y_{71})$ among the three-dimensional coordinates $(X_{71}, Y_{71}, Z_{71})$ of the tip portion 71 of the self-light emitting pointing element 70 and an instruction of the user is performed at the position. For example, in this state, the user is able to select the eraser tool by pushing the button switch 73 of the self-light emitting pointing element 70. As such, in the present embodiment, also, even in a case where the self-light emitting pointing element 70 is in a state of being separated from the screen surface SS, the button switch 73 is pushed so as to make it possible to give an instruction to the projector 100 according to the content of the projected screen PS in the operation point $OP_{71}$ arranged on the XY coordinates $(X_{71}, Y_{71})$ of the tip portion 71.

In FIG. 4B, a pen tool PE is selected as a tool representing a function of the tip portion 81 of the non-light-emitting pointing element 80 and the pen tool PE is rendered on the projected screen PS. As previously described, the three-dimensional position of the tip portion 81 of the non-light-emitting pointing element 80 is also determined by triangulation using the images captured by two cameras 310 and 320. Accordingly, the pen tool PE is rendered on the projected screen PS in such a way that the operation point $OP_{81}$ present in the tip of the pen tool PE is arranged on the position of the XY coordinates $(X_{81}, Y_{81})$ among the three-dimensional coordinates $(X_{81}, Y_{81}, Z_{81})$ of the tip portion 81 determined by triangulation. However, when the user gives an instruction to the projector 100 using the non-light-emitting pointing element 80, the instruction (rendering, tool selection, or the like) is performed in a state where the tip portion 81 of the non-light-emitting pointing element 80 is in contact with the projected screen PS.

In the example of FIG. 4, even in a case where the tip portion of the pointing element (self-light emitting pointing element 70 and non-light-emitting pointing element 80) is separated from the projected screen PS, a tool (mouse pointer PT or pen tool PE) selected by an individual pointing element is rendered and displayed on the projected screen PS. Accordingly, also, even in a case where the user does not put the tip portion of the pointing element in contact with the projected screen PS, there is an advantage that it is easy to understand which tool is selected by the pointing element and the operation is easy. The tool is rendered in such a way that an operation point OP of the tool is arranged at the position of the XY coordinates among the three-dimensional coordinates of the tip portion of the pointing element and thus, there is an advantage that the user is able to suitably recognize a position of a tool being used.

The interactive projection system 900 may be configured to simultaneously use a plurality of self-light emitting pointing elements 70. In this case, the light emitting patterns of the pointing element signal light PSL described above are preferably unique light emitting patterns capable of identifying a plurality of self-light emitting pointing elements 70. More specifically, in a case where it is possible to simultaneously use N (N is an integer of 2 or more) self-light emitting pointing elements 70, the light emitting patterns of pointing element signal light PSL are preferably capable of distinguishing N self-light emitting pointing elements 70. In a case where a plurality of unit light emitting periods are included in a set of light emitting patterns, it is possible to represent two values of light emission and non-light emission in one unit light emitting period. Here, one unit light emitting period corresponds to a period during which the tip light-emitting portion 77 of the self-light emitting pointing element 70 represents 1-bit information of on/off. In a case where a set of light emitting patterns is constituted with M (M is an integer of 2 or more) unit light emitting periods, $2^M$ states can be distinguished by a set of light emitting patterns. Accordingly, it is preferable that the number M of unit light emitting periods constituting a set of light emitting patterns M is set to satisfy the following expression.

$$N \times Q \leq 2^M: \quad (1)$$

Here, Q is the number of states distinguished by the switches 73 and 76 of the self-light emitting pointing element 70, in an example of the present embodiment, Q=2 or Q=4. For example, in a case of Q=4, it is preferable that when N is set as N=2, M is set as an integer of 3 or more, and when N is set as N=3 or 4, M is set as an integer of 4 or more. In this case, the position detection unit 600 (or control unit 700) executes identification using M images respectively captured by the cameras 310 and 320 in M unit light emitting periods of a set of light emitting patterns when identifying N self-light emitting pointing elements 70 and states of the switches 73 and 76 of each self-light emitting pointing element 70. The light emitting pattern of the M-bit is a pattern obtained by setting the pointing element signal light PSL to on or off in a state where irradiation detection light IDL is maintained in the off state, and the non-light-emitting pointing element 80 is not photographed in image captured by the cameras 310 and 320. It is preferable to further add a unit light emitting period of 1-bit, in which irradiation detection light IDL is set to the on state, in order to capture the image used for detecting the position of the non-light-emitting pointing element 80. However, the pointing element signal light PSL may be either of the on/off in the unit light emitting period for position detection. The image obtained in the unit light emitting period for position detection can also be used for position detection of the self-light emitting pointing element 70.

Specific examples of five kinds of signal light rendered in FIG. 3 are summarized as follows.

(1) Projection image light IML: It is image light (visible light) projected on the screen surface SS by the projection lens 210 in order to project the projected screen PS on the screen surface SS.

(2) Irradiation detection light IDL: It is near-infrared light with which the screen surface SS and space ahead of the screen surface SS are irradiated by the detection light irradiation unit 410 in order to detect the tip portion of the pointing element (self-light emitting pointing element 70 and non-light-emitting pointing element 80).

(3) Reflection detection light RDL: It is near-infrared light reflected by the pointing element (self-light emitting pointing element 70 and non-light-emitting pointing element 80) and received by two cameras 310 and 320, among near-infrared light irradiated as irradiation detection light IDL.

(4) Apparatus signal light ASL: It is near-infrared light regularly emitted from the signal light transmission unit 430 of the projector 100 in order to synchronize the projector 100 with the self-light emitting pointing element 70.

(5) Pointing element signal light PSL: It is near-infrared light emitted from the tip light-emitting portion 77 of the self-light emitting pointing element 70 at the timing synchronized with apparatus signal light ASL. The light emitting patterns of the pointing element signal light PSL are changed according to the on/off state of the switches 73 and 76 of the self-light emitting pointing element 70. The unique light emitting patterns for identifying the plurality of self-light emitting pointing elements 70 are included.

In the present embodiment, position detection of the tip portions of the self-light emitting pointing element 70 and the non-light-emitting pointing element 80 and determination of the content instructed by the self-light emitting pointing element 70 and the non-light-emitting pointing element 80 are respectively executed as follows.

<Outline of Position Detection Method and Distinction Method of Instruction Content of Self-Light Emitting Pointing Element 70>

The three-dimensional position of $(X_{71}, Y_{71}, Z_{71})$ of the tip portion 71 of the self-light emitting pointing element 70 is determined according to triangulation using the images captured by two cameras 310 and 320, by the position detection unit 600. In this case, whether it is the self-light emitting pointing element 70 or not can be recognized by determining whether the light emitting pattern of the tip light-emitting portion 77 appears on the images captured at a plurality of predetermined timings or not. Also, whether the tip portion 71 of the self-light emitting pointing element 70 is in contact with the screen surface SS or not (that is, whether the tip switch 76 is in an on state or not) can be determined by using the light emitting patterns of the tip light-emitting portion 77 in the images captured at the plurality of timings. The position detection unit 600 is also able to determine the instruction content of the self-light emitting pointing element 70 according to the on/off state of the switches 73 and 76 of the self-light emitting pointing element 70 and the content of the projection screen surface SS in the XY coordinates $(X_{71}, Y_{71})$ of the tip portion 71. For example, as exemplified in FIG. 4B, in a state where the position of the XY coordinates $(X_{71}, Y_{71})$ of the tip portion 71 is present on any of the buttons within the toolbox TB, in a case where the tip switch 76 is in an on state, a tool of the button is selected. As exemplified in FIG. 2B, when the XY coordinates $(X_{71}, Y_{71})$ of the tip portion 71 are present at a position other than the toolbox TB within the projected screen PS, processing by the selected tool (for example, rendering) is selected. The control unit 700 causes the projection image generation unit 500 to render a preselected pointer or a mark, using the XY coordinates $(X_{71}, Y_{71})$ of the tip portion 71 of the self-light emitting pointing element 70, such that the pointer or the mark is arranged at the positions $(X_{71}, Y_{71})$ within the projected screen PS. The control unit 700 executes processing according to the content instructed by the self-light emitting pointing element 70 and causes the projection image generation unit 500 to render an image including the processing result.

<Outline of Position Detection Method and Determination Method of Instruction Content of Non-Light-Emitting Pointing Element 80>

The three-dimensional position of $(X_{81}, Y_{81}, Z_{81})$ of the tip portion 81 of the non-light-emitting pointing element 80 is also determined according to triangulation using the images captured by two cameras 310 and 320. In this case, whether it is the non-light-emitting pointing element 80 or not can be recognized by determining whether the light emitting pattern of the self-light emitting pointing element 70 appears on the images captured at a plurality of predetermined timings or not. In two images captured by two cameras 310 and 320, the position of the tip portion 81 of the non-light-emitting pointing element 80 can be determined by using a well known art such as a template matching or a feature extraction method. For example, in a case where the tip portion 81 of the non-light-emitting pointing element 80 which is the finger is recognized by template matching, a plurality of templates relating to the finger are prepared and the tip portion 81 of the finger can be recognized by retrieving a portion suitable for the templates in the image captured by two cameras 310 and 320. Whether the tip portion 81 of the non-light-emitting pointing elements 80 is in contact with the screen surface SS or not can be determined according to whether a difference between a Z coordinate value of the tip portion 81 determined by triangulation and a Z coordinate value of a surface of the screen surface SS is equal to or less than a minute tolerance or not, that is, according to whether the tip portion 81 is sufficiently near the surface of the screen surface SS or not. As the tolerant difference, a small value of approximately 2 mm to 6 mm is preferably used. In a case where it is determined that the tip portion 81 of the non-light-emitting pointing elements 80 is in contact with the screen surface SS, the position detection unit 600 determines the instruction content according to the content of the projection screen surface SS at the contact position. The control unit 700 causes the projection image generation unit 500 to render a preselected pointer or a mark, using the XY coordinates $(X_{81}, Y_{81})$ of the tip of the non-light-emitting pointing element 80 detected by the position detection unit 600, such that the pointer or the mark is arranged at the positions $(X_{81}, Y_{81})$ within the projected screen PS. The control unit 700 executes processing according to the content instructed by the non-light-emitting pointing element 80 and causes the projection image generation unit 500 to render an image including the processing result.

(B. Preferable Arrangement and Direction of Camera)

Figure 5A:
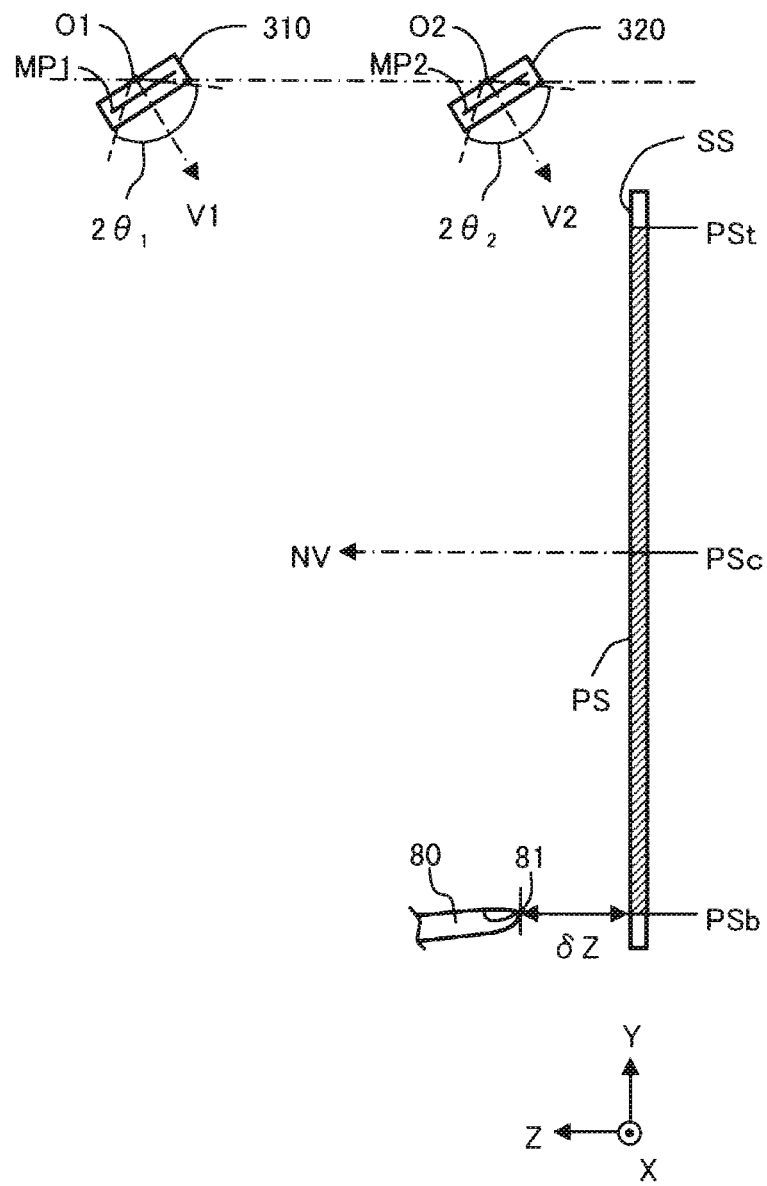
FIG. 5A is explanatory diagram for illustrating arrangement and directions of two cameras.

FIG. 5A is an explanatory diagram illustrating arrangement and directions of two cameras 310 and 320. FIG. 5A illustrates the arrangement of the YZ plane passing camera reference positions O1 and O2 of respective cameras 310 and 320. The first camera 310 is arranged at a position of which a perpendicular distance (distance in a Z direction) from the screen surface SS is larger than that of the second camera 320. Here, arrangement of two cameras 310 and 320 and the screen surface SS is modeled as follows.

(1) Image surfaces MP1 and MP2: Image surfaces MP1 and MP2 are image formation surfaces of respective cameras. In an actual camera, the image surfaces MP1 and MP2 correspond to a light receiving surface of an image sensor.

(2) Camera reference positions O1 and O2: Camera reference positions O1 and O2 are reference coordinate positions of respective cameras. In the model of FIG. 5, in the first camera 310, an image on the image surface MP1 corresponding to an arbitrary object-point in a three-dimensional space is formed at a position of an intersection of a straight line connecting the object-point and the camera reference position O1 and the image surface MP1. The second camera 320 is also similar to the first camera 310. In the actual camera, the camera reference positions O1 and O2 correspond to condensing positions located at substantially the centers of lenses of respective cameras. In the actual camera, the centers of the lenses are located ahead of the image surfaces MP1 and MP2. However, as in FIG. 5A, even when it is assumed that the image surfaces MP1 and MP2 are located ahead of the camera reference positions O1 and O2 (centers of lenses), it is equivalent to the actual camera.

(3) Optical axes V1 and V2: Optical axes V1 and V2 are optical axes of the optical systems of respective cameras and are orthogonal to the image surfaces MP1 and MP2. A unit vector parallel to a direction of an optical axis is also called an "optical axis vector". A direction of the optical axis V1 of the first camera 310 is inclined from both the Z direction and the Y direction, and is a direction directed obliquely downward so as to pass through the area of the projected screen PS. Similarly, a direction of the optical axis V2 of the second camera 320 is inclined from both the Z direction and the Y direction of the projected screen PS, and is a direction directed obliquely downward so as to pass through the area of the projected screen PS. In the example of FIG. 5A, two optical axes V1 and V2 are parallel to each other, but may not be parallel to each other.

(4) Field angles $2\theta_1$ and $2\theta_2$: Field angles $2\theta_1$ and $2\theta_2$ are field angles of respective cameras. The directions of the optical axes V1 and V2 and sizes of the field angles $2\theta_1$ and $2\theta_2$ are set so as to make it possible for the respective cameras 310 and 320 to capture an image of the entirety of the projected screen PS. The field angles $2\theta_1$ and $2\theta_2$ of two cameras 310 and 320 may be equal or may differ.

(5) Normal line NV of projected screen PS: The normal line NV is a normal line with respect to the projected screen PS (that is, screen surface SS). A unit vector parallel to a normal line direction is also called a "normal line vector" or "projected screen normal line vector". A case where projected screen PS or the screen surface SS is not a plane surface but a curved surface is considered. In this case, the normal line in geometrical center of the projected screen PS is defined as a "normal line NV of projected screen PS".

In FIG. 5A, a state where the tip portion 81 of the non-light-emitting pointing element 80 is separated from the projected screen PS by a distance δZ is rendered. As described above, the three-dimensional position of the tip portion 81 of the non-light-emitting pointing element 80 is determined by triangulation using the images captured by two cameras 310 and 320. As described in the Background Art section, in the interactive projection system 900, it is desirable to accurately detect the distance δZ in the Z direction between the tip portion 81 of the non-light-emitting pointing element 80 and the screen surface SS. In the present embodiment, detection accuracy of the distance δZ in the Z direction between the tip portion 81 of the non-light-emitting pointing element 80 and the screen surface SS is improved by contriving the arrangement and directions of two cameras 310 and 320. Detection accuracy of the distance in the Z direction δZ is also called a "resolution of Z coordinate".

Resolution of the Z coordinate by the cameras 310 and 320 is the lowest at the lower end PSb of the projected screen PS, is the highest at the upper end PSt of the projected screen PS, and is medium at the center PSc of the projected screen PS. The reason is that the lower end PSb of the projected screen PS is farthest from the cameras 310 and 320. Actually, a position (called a "worst position") at which resolution of the Z coordinate is the lowest is a position near left and right ends of the lower side of the projected screen PS in FIG. 4B. However, as in FIG. 5A, when resolution of the Z coordinate in the YZ plane passing respective camera reference positions O1 and O2 of respective cameras 310 and 320 is investigated, resolution of the Z coordinate in the worst position is also proportional to the position and thus, it is sufficient in practical use. The lower end PSb of the projected screen PS in FIG. 5A corresponds to a first intersection at which the lower side among four sides of the projected screen PS intersects a first YZ plane passing the camera reference position O1 (that is, center of lens) of the first camera 310. Similarly, also regarding the second camera 320, the lower end PSb of the projected screen PS in FIG. 5A corresponds to a second intersection at which the lower side of the projected screen PS intersects a second YZ plane passing the camera reference position O2 (that is, center of lens) of the second camera 320.

In FIG. 5A, the second camera 320 is arranged at a position of which the perpendicular distance (distance in the Z direction) from the projected screen PS is smaller than that of the first camera 310. Two cameras 310 and 320 are arranged at positions at which positions in the Y direction are the same (heights from the projected screen PS are the same). Furthermore, the optical axes V1 and V2 of two cameras 310 and 320 are parallel to each other.

Figure 5B:
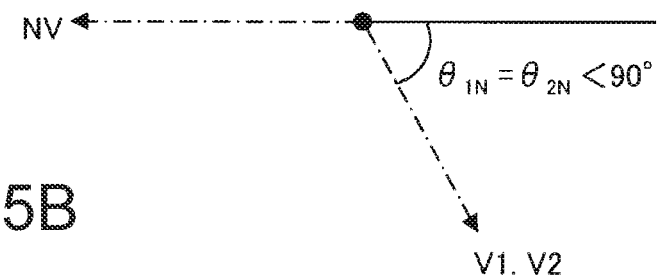
FIG. 5B is an explanatory diagram for illustrating arrangement and directions of two cameras.

FIG. 5B illustrates a relationship between the optical axis vectors V1 and V2 of two cameras 310 and 320 and the projected screen normal line vector NV. The optical axis vectors V1 and V2 are obliquely inclined from the projected screen normal line vector NV and angles $\theta_{1N}$ and $\theta_{2N}$ between each of the optical axis vectors V1 and V2 and the projected screen normal line vector NV are respectively smaller than 90°. The projected screen normal line vector NV is directed toward the Z direction and thus, the angles $\theta_{1N}$ and $\theta_{2N}$ correspond to angles between each of the directions of the optical axes V1 and V2 and the Z direction, respectively. Although the angles $\theta_{1N}$ and $\theta_{2N}$ may be set to a range greater than 0° and less than 90°, it is preferable to set a value which falls within a range from 50° to 70°. Matters regarding this will be described later. As will be described later, in the present embodiment, the second camera 320 is arranged at a position nearer the projected screen PS than that of the first camera 310 to thereby increase resolution of the Z coordinate.

Figure 6:
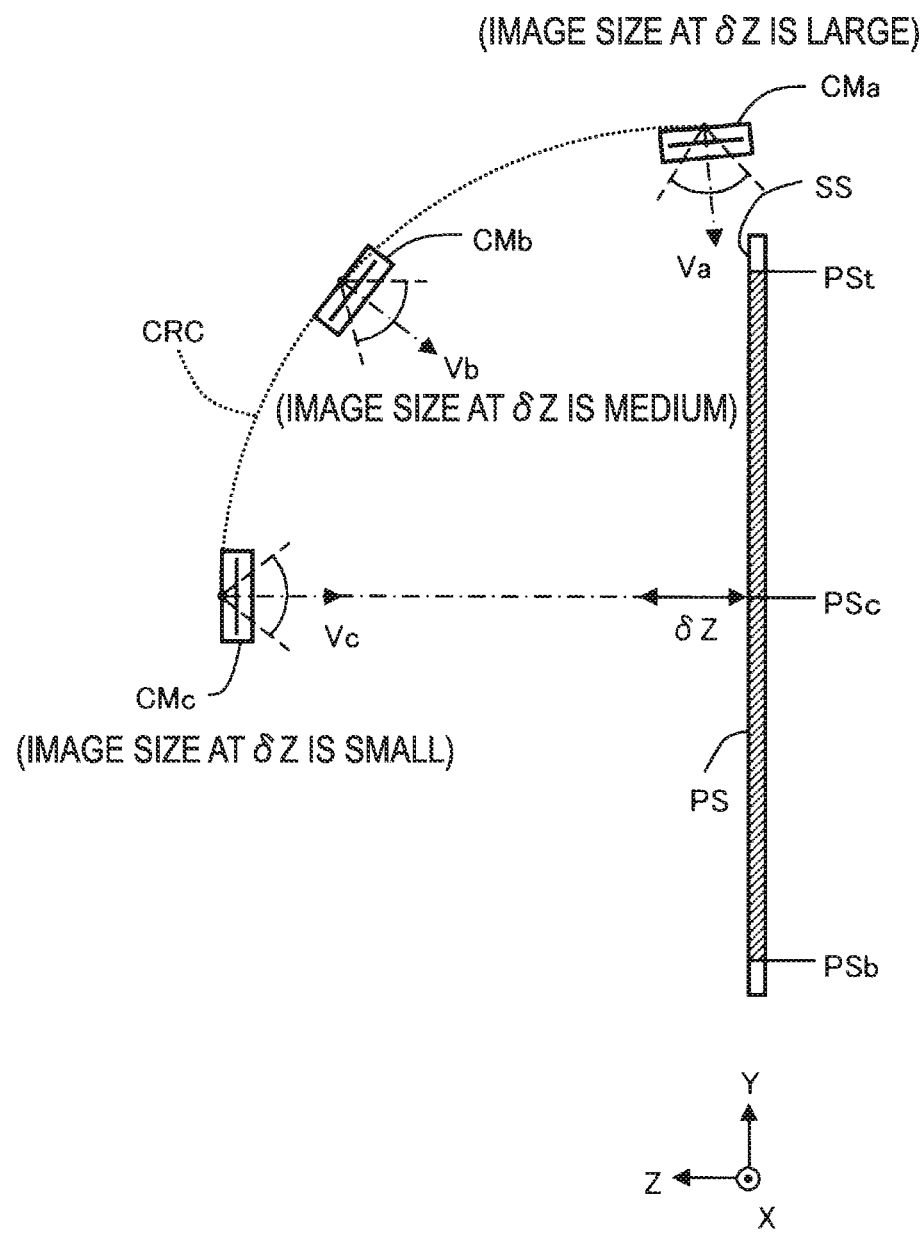
FIG. 6 is an explanatory diagram for illustrating an example of virtual arrangement of cameras.

FIG. 6 illustrates an example of virtual arrangement of the cameras. Here, a situation in which cameras are virtually set in three camera positions CMa, CMb, and CMc along a locus CRC of an arc shape around the center PSc of the projected screen PS is illustrated. In the three camera positions CMa to CMc, all optical axes Va to Vc of the cameras are set to directions directed toward the center PSc of the projected screen PS. Here, regarding the distance δZ in the Z direction in the center PSc of the projected screen PS, sizes of images at three camera positions CMa to CMc are considered. At the lowest camera position CMc, the optical axis Vc is approximately parallel to the Z direction and thus, the image size in the Z direction is very small. On the other hand, at the camera position CMa which is located at the highest position and is nearest to the projected screen PS, the image size in the Z direction is the largest, and at the camera position CMb which is located at an intermediate height, the image size in the Z direction is a size of an medium degree. Accordingly, at the camera position CMa nearest to the projected screen PS, resolution of the Z coordinate is the highest compared to other camera positions CMb and CMc.

The position of the second camera 320 illustrated in FIG. 5A is near the camera position CMa of FIG. 6 and thus, resolution of the Z coordinate is higher than a case where the cameras are installed at other camera positions CMb and CMc of FIG. 6. The first camera 310 is arranged at a position which is moved further upward from the camera position CMb having the intermediate height of FIG. 6. At the position of the first camera 310, a distance from the camera to the projected screen PS is increased to be greater than that of the camera position CMb. Accordingly, resolution of the first camera 310 of FIG. 5(A) becomes lower than resolution of the Z coordinate of the camera position CMb of FIG. 6. As such, the second camera 320 is arranged at a position nearer the projected screen PS than that in the first camera 310 to thereby make it possible to increase resolution of the Z coordinate.

Regarding the second camera 320, an image size of the distance δZ in the Z direction on the image surface MP2 is increased as the angle $\theta_{2N}$ (FIG. 5B) of the optical axis V2 becomes smaller (becomes closer to the Z direction) and thus, resolution of the Z coordinate is increased. However, when the angle $\theta_{2N}$ is excessively reduced, a width of the image in the Y direction of the projected screen PS on the image surface MP2 is excessively reduced and thus, resolution in the Y coordinate is lowered. From these points, when balance between resolutions of the Z coordinate and the Y coordinate is taken into account, the angle $\theta_{2N}$ of the optical axis V2 of the second camera 320 is preferably set to a value within a range from 50° to 70°, especially preferably set to a range of 60° to 70°.

Regarding the first camera 310, change in resolution of the Z coordinate due to the difference in the angle $\theta_{1N}$ of the optical axis V1 is small in comparison with the second camera 320. In the first camera 310, resolution of the Y coordinate higher than that of the second camera 320 is obtained. On the other hand, in the second camera 320, resolution of the Z coordinate higher than that of the first camera 310 is obtained. Resolutions of the X coordinate in the two cameras 310 and 320 are substantially the same. It is preferable that the angles $\theta_{1N}$ and $\theta_{2N}$ of the optical axes V1 and V2 of two cameras 310 and 320 are respectively set to a range with an excellent balance between resolutions of the Y coordinate and the Z coordinate by comprehensively considering the points described above. Specifically, the angles $\theta_{1N}$ and $\theta_{2N}$ are preferably set to a value within a range from 50° to 70°, especially preferably set to a range of 60° to 70°. When the optical axis V1 of the first camera 310 is set parallel to the optical axis V2 of the second camera 320, it is preferable in that calculation of coordinate transformation in triangulation can be simplified and the three-dimensional position of the pointing element can be more accurately determined.

As such, in the present embodiment, the second camera 320 is arranged at a position nearer the projected screen PS than that in the first camera 310 to thereby make it possible to increase resolution of the Z coordinate and obtain sufficiently high resolution regarding the Y coordinate as well. The positions (X coordinates) along the X direction of two cameras 310 and 320 may be equal or may differ.

In the present embodiment, the directions of the optical axes V1 and V2 of two cameras 310 and 320 are directed toward an oblique downward direction passing the area of the projected screen PS to thereby further increase resolution of the Z coordinate. The "oblique downward direction passing the area of the projected screen PS" corresponds to a direction inclined from both the Z direction and a direction (arbitrary direction perpendicular to Z direction) perpendicular to the Z direction.

Figure 7:
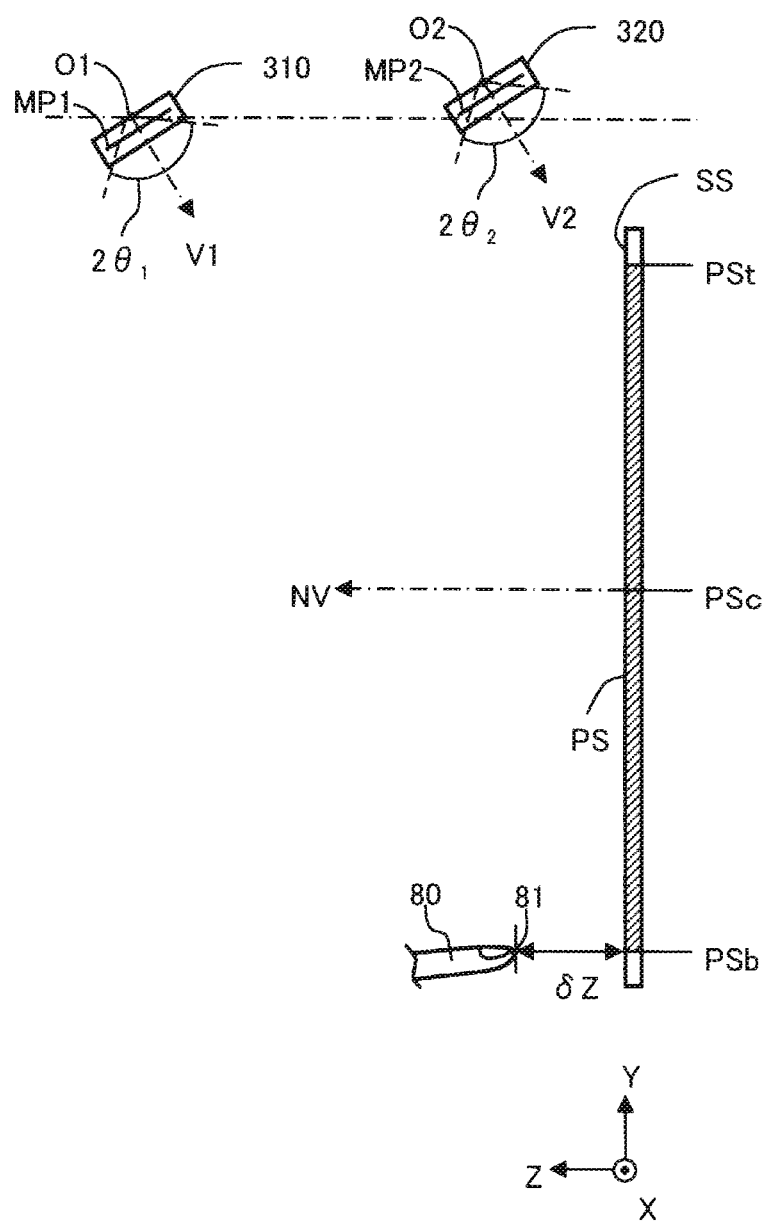
FIG. 7 is an explanatory diagram for illustrating another arrangement of two cameras.

FIG. 7 illustrates another example of the arrangement of the cameras. In this arrangement example, the second camera 320 is moved upward above the first camera 310, and other configuration and directions are the same as those of FIG. 5A. The reason that the second camera 320 is moved upward is to make change in the magnification of Y direction small in the second camera 320. That is, in the arrangement of FIG. 5A, the second camera 320 is very close to the projected screen PS and thus, the upper end PSt of the projected screen PS is extremely close to the second camera 320 and on the other hand, the lower end PSb of the projected screen PS is quite far from the second camera 320. Accordingly, the magnification of Y direction in the vicinity of the upper end PSt of the projected screen PS is very large in the image of the second camera 320 and in contrast, the magnification of Y direction in the vicinity of the lower end PSb of the projected screen PS is very small. As such, in a case where the difference in the magnification of Y direction between the vicinity of the upper end PSt and the vicinity of the lower end PSb of the projected screen PS is large in the second camera 320, detection accuracy of the Y coordinate by triangulation may be lowered. Accordingly, as in FIG. 7, the position of the second camera 320 is moved upward above the first camera 310 such that the difference of the magnification of Y direction in the vicinity of the lower end PSb of the projected screen PS can be made small in the image of the second camera 320 and thus, it is possible to increase detection accuracy of the three-dimensional position. However, also, in this case, the position of the second camera 320 is preferably arranged at a position to which the distance from the lower end PSb of the projected screen PS is nearer than that of the first camera 310. By doing this, a state in which resolution of the Z coordinate higher than that of the first camera 310 can be maintained in the second camera 320, and it is possible to maintain high resolution of the Z coordinate.

MODIFICATION EXAMPLE:

The invention is not limited to the embodiments and examples described above and can be embodied by various forms in a range without departing from a gist thereof, and for example, the following modification may also be possible.

Modification Example 1:

In the embodiment described above, although the image-capturing unit 300 is made to include two cameras 310 and 320, the image-capturing unit 300 may be made to include three or more cameras. In the latter case, the three-dimensional coordinates (X, Y, and Z) may be determined based on m (m is an integer of 3 or more) images captured by m cameras. For example, $_mC_2$ combinations obtained by arbitrarily selecting two images from m images may be used to obtain respective three-dimensional coordinates to determine the final three-dimensional coordinate using an average of the three-dimensional coordinates. Then, it is possible to further increase detection accuracy of the three-dimensional coordinates.

Modification Example 2:

In the embodiment described above, although the interactive projection system 900 is made operable in the whiteboard mode and PC interactive mode, the system may be configured to be operated at only one mode among the modes. The interactive projection system 900 may be configured to operate at a mode other than the two modes and also, may be configured to operate at a plurality of modes including the two modes.

Modification Example 3:

In the embodiment described above, although all of irradiation detection light IDL, reflection detection light RDL, apparatus signal light ASL, and pointing element signal light PSL illustrated in FIG. 3 are set as near-infrared light, some or all of these may be light other than near-infrared light.

Modification Example 4:

In the embodiment described above, although the projection screen is projected on a plane screen plate 920, the projection screen may also be projected on a curved screen. Also, in this case, the three-dimensional position of the tip portion of the pointing element can be determined by using triangulation using the image captured by two cameras and thus, it is possible to determine a positional relationship between the tip portion of the pointing element and the projection screen.

As described above, although the embodiment of the invention is described based on several examples, the embodiment described above is made to easily and readily understand the invention and is not intended to limit the invention. It is needless to say that the invention may be modified and improved without departing from a gist thereof and claims and equivalents to claims are included in the invention.

The entire disclosure of Japanese Patent Application No. 2015-065633, filed Mar. 27, 2015 is expressly incorporated by reference herein.

REFERENCE SIGNS LIST

70: self-light emitting pointing element
71: tip portion
72: shaft portion
73: button switch
74: signal light reception unit
75: control unit
76: tip switch
77: tip light-emitting portion
80: non-light-emitting pointing element
81: tip portion
100: interactive projector
200: projection unit
210: projection lens
220: optical modulation unit
230: light source
300: image-capturing unit
310: first camera
320: second camera
410: detection light irradiation unit
430: signal light transmission unit
500: projection image generation unit
510: projection image memory
600: position detection unit
700: control unit
900: interactive projection system
910: support member
920: screen plate

The invention claimed is:

1. An interactive projector receiving an instruction by a pointing element of a user with respect to a projected screen, the interactive projector comprising:
   a projection unit that projects the projected screen on a screen surface;

a plurality of cameras that include a first camera and a second camera capturing an image of an area of the projected screen, the first camera having a first optical axis extending in a first direction, the second camera having a second optical axis extending in a second direction, and both the first direction and the second direction passing through the area of the projected screen; and a position detection unit that detects a three-dimensional position of the pointing element with respect to the projected screen based on a plurality of images which are captured by the plurality of cameras, the plurality of images including the pointing element, wherein:

when a direction separated from the projected screen is defined as a Z direction, the second camera is arranged at a position nearer the projected screen than that of the first camera in the Z direction;

both the first direction and the second direction are inclined from both the Z direction and a direction perpendicular to the Z direction; and the first direction and the second direction are parallel to each other.

2. The interactive projector according to claim 1, wherein angles between each of the first direction and the second direction and the Z direction are in a range from 50 to 70 degrees.

3. The interactive projector according to claim 1, wherein when it is defined that two directions orthogonal to each other on the projected screen and perpendicular to the Z direction are the X direction and the Y direction, a +Y direction is called an upward direction and a −Y direction is called a downward direction, and the projected screen is projected on a position located lower than the interactive projector, the second camera (i) is arranged at a position farther deviated in the upward direction than the first camera in the Y direction, and (ii) is arranged at a position to which a distance from the lower end of the projected screen is nearer than that of the first camera.

4. An interactive projection system comprising:
the interactive projector according to claim 1; and
a screen which includes a screen surface on which the projected screen is projected.

5. An interactive projector receiving an instruction by a pointing element of a user with respect to a projected screen, the interactive projector comprising:

a projection unit that projects the projected screen on a screen surface;

a plurality of cameras that include a first camera and a second camera capturing an image of an area of the projected screen, the first camera having a first optical axis extending in a first direction, the second camera having a second optical axis extending in a second direction, and both the first direction and the second direction passing through the area of the projected screen; and a position detection unit that detects a three-dimensional position of the pointing element with respect to the projected screen based on a plurality of images which are captured by the plurality of cameras, the plurality of images including the pointing element, wherein:

when a direction separated from and perpendicular to the projected screen is defined as a Z direction, the second camera is arranged at a position nearer the projected screen than that of the first camera in the Z direction;

both the first direction and the second direction are inclined from both the Z direction and a direction perpendicular to the Z direction; and angles between each of the first direction and the second direction and the Z direction are in a range from 50 to 70 degrees.

* * * * *